United States Patent [19]

Aurich

[11] Patent Number: 4,683,762

[45] Date of Patent: Aug. 4, 1987

[54] CONTAINMENT SYSTEM

[76] Inventor: John P. Aurich, 18 Scarborough Heights Blvd., Scarborough, Ontario, Canada, M1M 2V4

[21] Appl. No.: 753,512

[22] Filed: Jul. 10, 1985

[51] Int. Cl.$^4$ ............................................. G01N 1/26
[52] U.S. Cl. .................................. 73/863.58; 73/40.7
[58] Field of Search .............. 73/40.7, 863.53, 863.54, 73/863.58, 863.81, 863.82

[56] References Cited

U.S. PATENT DOCUMENTS

| | | | |
|---|---|---|---|
| 3,885,437 | 5/1975 | Reagan | 73/863.58 |
| 4,055,075 | 10/1977 | Allan et al. | 73/40.7 |
| 4,324,568 | 4/1982 | Wilcox et al. | 73/40.7 |
| 4,494,403 | 1/1985 | Bowers et al. | 73/863.58 |

Primary Examiner—Stewart J. Levy
Assistant Examiner—Robert R. Raevis
Attorney, Agent, or Firm—Rogers, Bereskin & Parr

[57] ABSTRACT

An apparatus, suitable for monitoring the efficiency of a containment system, has an elongate platform for spanning a duct. A carriage is slidably mounted on the platform. First and second drive shaft are arranged for driving the platform across the duct and the carriage along the platform. An intermediate drive shaft is arranged for driving the first drive shafts. A drive means is arranged outside the duct, connected to the intermediate shaft and a fluid seal is provided around the intermediate shaft. The second drive shaft can either be driven from the intermediate drive shaft, or from a separate drive unit.

26 Claims, 4 Drawing Figures

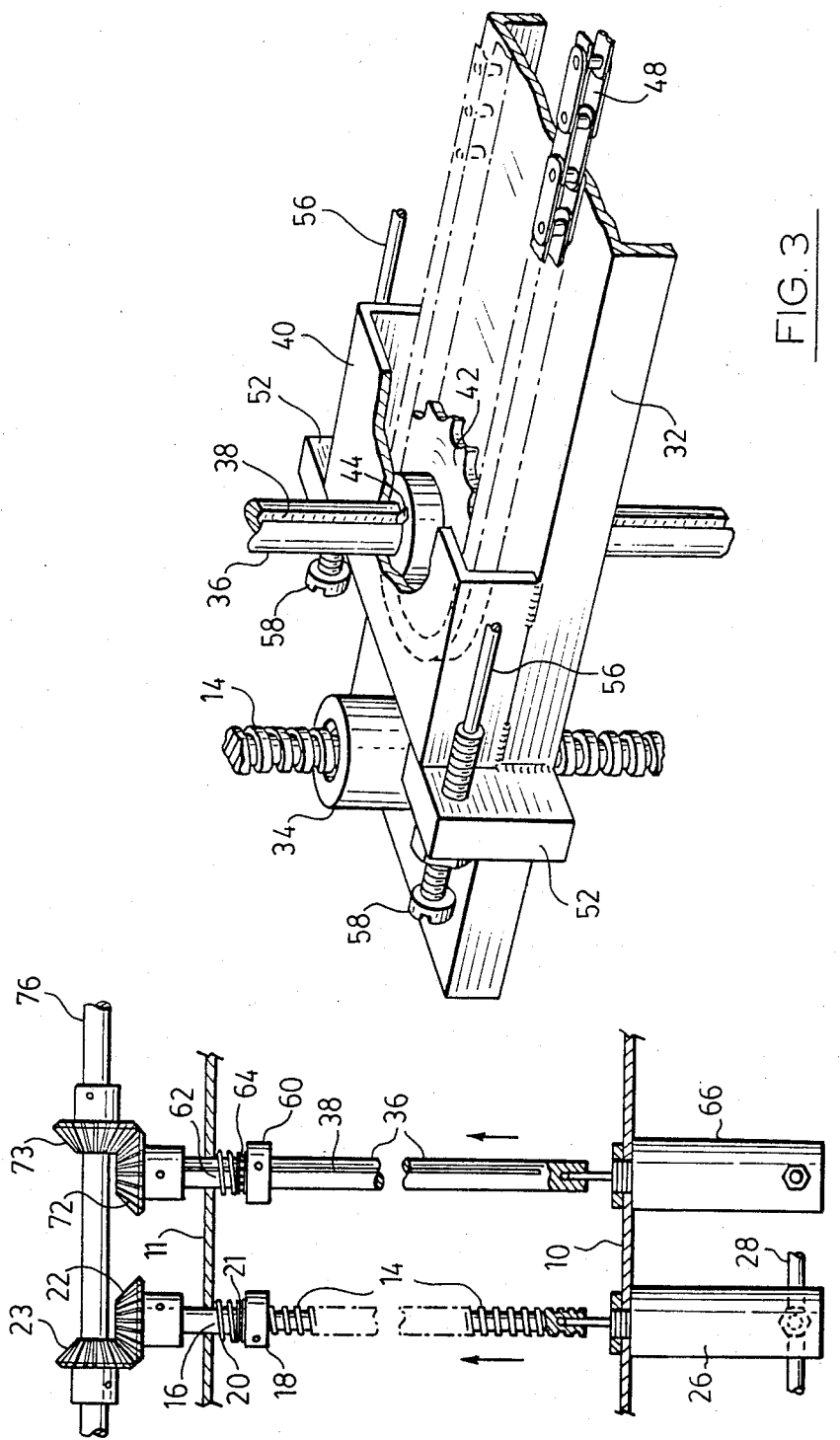

CONTAINMENT SYSTEM

This invention relates to a containment system. This invention is more particularly concerned with an apparatus for checking or proving the security or effectiveness of a containment system.

At the present time, there are numerous applications, where containment systems are required. Typically, a containment system has an enclosed area, in which a dangerous substance must be contained. For example, laboratories working with dangerous microbes, chemicals toxic in very small quantities and radioactive materials, require a containment system which will prevent escape of the relevant material. To this end, the areas are fully enclosed, and any exhaust from that area is passed through a filter in a duct. Typically, the filter is certified to remove 99.99% of the microbe or other substance of concern.

The problem arises of checking some containment systems, and ensuring that they are always fully effective. To this end, one should check the performance of the filters on a regular basis. A high performance filter may, after a period of use, develop defects, which considerably reduce its efficiency.

Prior to use of a containment system, checking is relatively easy, as it has not yet been contaminated by any dangerous products. Thus, as is known, one can simply use smoke of the same particle size, injected into an air stream upstream of the filter. Then, a simple hand held detector is traversed across the face of the filter, on its downstream side, to detect the amount of smoke particles penetrating through the filter.

Once the system has been in use, this technique cannot readily be repeated, as the containment enclosure is contaminated and also the duct work downstream from the filter if the filter has failed.

Proposals have been made for an automated system, using what can be described as an X-Y plotter arrangement (U.S. Pat. No. 4,494,403). This employs two electric motors and associated drive shafts within the duct, downstream from the filter. The shafts are perpendicular, and drive an air sensor in corresponding perpendicular directions, so as to cover the cross-section of the duct. This has numerous disadvantages. The motors and much control circuitry are located in the duct. Again, this creates problems if they fail, as they may have been contaminated. Further, the output from the sensor is presented in the form of a continuous strip, which is difficult to interpret.

It is desirable that any system for checking a filter for a containment system should have components in the air stream, which are simple, rugged and reliable. Any components that might require much routine maintenance should be placed outside the air stream. In particular, for many applications there is the possibility of inflammable gases being present in a duct. Consequently, electric motors or other spark generating devices cannot be permitted in the duct. Further, the system should be capable of checking the entire cross-section on a fine grid, so as to detect any small imperfections in a filter.

In accordance with the present invention, there is provided an apparatus, suitable for use in monitoring the constituents of a fluid flow, the apparatus comprising: platform means adapted for spanning a duct; a first drive shaft for driving the platform means across the duct; carriage means slidably mounted on the platform means; a second drive shaft for driving the carriage means along the platform means, whilst permitting movement of the platform when driven by the first drive shaft; drive means arranged for mounting outside a duct and for driving the first and second drive shafts; and fluid seal means, providing a fluid seal for the drive means, to prevent communication between the interior and exterior of a duct.

Preferably, the apparatus further comprises an intermediate shaft, respective first and second transmission means for transmitting power between the intermediate shaft and the first and second drive shafts, and first and second actuation means for causing engagement of the first and second transmission means respectively. In this case, the drive means can be a single drive motor.

Preferably, two first drive shafts are provided, with corresponding first transmission means and first actuation means. They should be provided at either end of the platform. This can then ensure that the platform will travel uniformly across a duct. The actuation means are preferably pneumatic, to prevent problems caused by use of electrical actuators. Each transmission means is preferably a pair of bevel gears, with one gear mounted on a respective shaft. Then, to engage the bevel gears, the corresponding shaft and bevel gear is simply displaced axially, to engage the other bevel gear mounted on the intermediate shaft. The drive means is preferably a stepping motor. In this case, the number of teeth on the bevel gears should correspond to the stepping motor, so that the bevel gears are always orientated ready for engagement with one another when the stepping motor is stopped.

Thus, in the preferred form of the invention, one has an apparatus, which has a single stepping motor mounted outside the duct. However, the motor is connected via intermediate and drive shafts, to enable a carriage to be traversed completely across the cross-section of the duct. The use of a stepping motor enables the carriage to be traversed across a pre-determined grid. With an appropriate sensor or detector mounted on the carriage, one can sample the flow at all grid points. Thus, with the apparatus located immediately downstream from a filter, one can sample the flow leaving the filter at all points on a predetermined grid. This is considerably more precise and reliable than attempting to check a filter by hand. All the components in the duct can be of a simple, mechanical nature, and hence inherently reliable. Even for environments with extremely hostile contaminants, one then has an apparatus which enables the performance of filters to be readily checked at routine intervals.

For a better understanding of the present invention, and to show more clearly how it may be carried into effect, reference will now be made, by way of example, to the accompanying drawings, which show a preferred embodiment of the present invention and in which:

FIG. 2 is a view along the axis of the apparatus of part thereof, on a larger scale;

FIG. 3 is a perspective view, on a larger scale of the part of the apparatus of FIG. 1 within circle 3.

Figure 1:
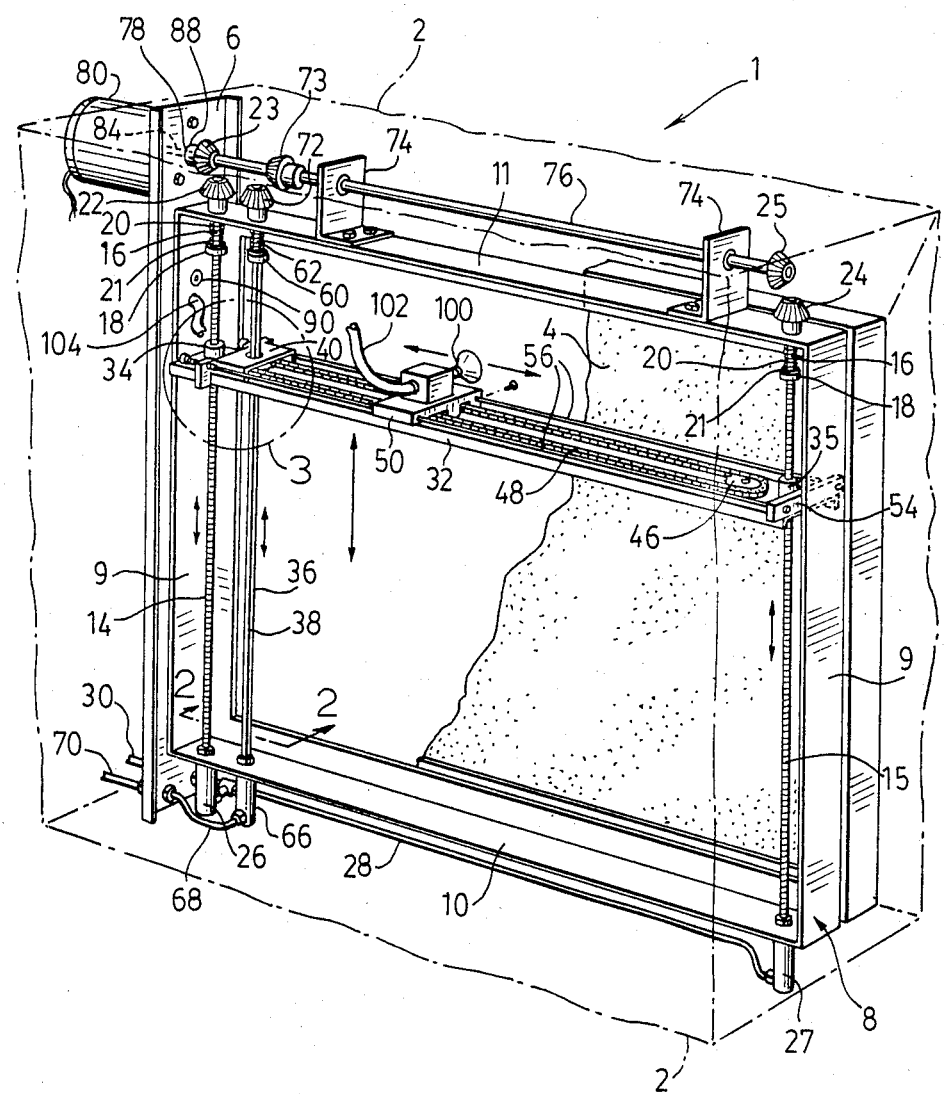
FIG. 1 is a perspective view of an apparatus of the present invention, installed in a duct shown in outline, with a filter, partially shown, in the duct.

The drawings show one embodiment of the present invention. It is to be appreciated that the apparatus can be scaled to fit a wide variety of ducts, ranging for few feet wide, to in excess of ten feet.

The apparatus as a whole is denoted by the reference 1, and is shown mounted in a duct 2. Upstream from the apparatus 1 is a filter 4. As shown, most of the apparatus 1 is located in the duct 2. The apparatus 1 includes a mounting flange 6. This flange 6 closes a corresponding opening in the duct 2, and is sealed to it.

The apparatus 1 has a frame 8, which is formed from L-Section members, as indicated. The frame 8 includes two side members 9 and respective bottom and top members 10, 11.

Two first shafts 14, 15 are rotatably mounted in the frame 8. The first shafts 14, 15 are vertical, and adjacent respective side members 9. Each first shaft 14, 15 in this embodiment is a ball screw over the majority of its length. The upper portions of the first shafts 14, 15 are plain, as indicated at 16. To each shaft 14, 15 a collar 18 is secured, as by a set screw or the like, at the junction between the ball screw and plain portions of the shaft. A helical compression spring 20 is provided between each collar 18 and the top member 11. Additionally, a pair of washers and a thrust bearing are provided between each collar 18 and its respective spring 20, as indicated at 21. At the upper end of the shafts 14, 15, respective bevel gears 22, 24 are secured, again as by set screws or the like.

At the lower ends of the shafts 14, 15 respective pneumatic actuation devices 26, 27 are provided. Each pneumatic actuation device 26, 27 comprises a piston and cylinder assembly. The shafts 14, 15 are mounted for vertical, axial movement, so that they can be displaced upwards against the action of the springs 20, by the actuation devices 26, 27. A pneumatic input line 28 is connected to the two pneumatic actuation devices 26, 27 and to an inlet port 30.

A transverse platform 32 extends across the width of the frame 8, and is mounted for movement across the frame 8 in a vertical direction. At either end of the platform 32, there are apertures, and corresponding ball screw collars 34, 35 are secured to the platform 32, engaging the first threaded ball shafts 14, 15. As detailed below, this enables the first shafts 14, 15 to cause the platform 32 to traverse the frame 8.

Adjacent the first shaft 14, there is mounted a second shaft 36, which is a plain shaft with a keyway 38 extending along most of the length thereof. The shaft 36 also extends through the platform 32, and through a housing 40, which defines a rectangular enclosure with the platform 32. Within this rectangular enclosure, a sprocket 42 is provided. The sprocket 42 is slidably mounted on the second shaft 36, and includes a corresponding key 44 engaging the keyway 38. At the other end of the platform 32, adjacent the first shaft 15, another sprocket 46 is rotatably mounted. A chain 48 extends around the two sprockets 42, 46. A carriage 50 is secured at one side to the chain 48, as by set screws or the like. In this embodiment, the carriage 50 is a brass block.

Two arms 52 are provided at the left-hand end of the platform 32, and one arm 54 at the other end. Between the arms 52, 54, two wires 56 extend. The wires 56 are maintained in tension by screw and lock nut arrangements 58. The carriage 50 includes apertures in which the wires 56 are received. The wires 56 have a relatively large diameter, and, as they are maintained in tension, they serve to keep the carriage 50 in the correct orientation. They enable the apparatus 1 to be used at any angle, whilst maintaining the carriage 50 correctly aligned. The carriage 50 is free to slide along the wires 56, as driven by the chain 48.

Like the first shafts 14, 15 the second shaft 36 has a collar 60 secured to it at its upper end. A compression spring 62 is provided between the collar 60 and the top frame member 11. Also a thrust bearing and washers 64 are provided between the collar 60 and spring 62. A pneumatic actuation device 66 is secured to the bottom frame member 10, like the pneumatic actuation devices 26, 27, for displacing the second shaft 36 upwards. A pneumatic supply line 68 connects the pneumatic actuation device 66 to a respective inlet port 70. A bevel gear 72 is secured to the upper end of the second shaft 36.

L-shape brackets 74 are mounted on top of the top member 11, and secured by screws or the like. The brackets 74 include plain bores, in which an intermediate shaft 76 is rotatably mounted. Bevel gears 23, 25, 73 are mounted on the intermediate shaft 76, for meshing with respective bevel gears 22, 24, 72. All the bevel gears are secured by set screws, and in known manner transmit torque through keys.

In this embodiment, the bevel gears 22-25, 72, 73 are miter gears, i.e. they each have a pitch cone angle of 45°.

The intermediate shaft 76 extends through an opening 78 in the flange 6. A stepping motor 80 is secured to supports welded to the flange 6. The stepping motor has an output shaft 84, which is inserted into a bore at the end of the input shaft 76, and secured by a cotter pin. A rotatable fluid seal 88 is provided between the intermediate shaft 76 and the flange 6, so as to securely seal off the interior of the duct 2.

One electrical input socket 90 is provided on the flange 6. Although not shown, on the frame 8, a number of microswitches, for example four microswitches are mounted, so as to be actuated by movement of the transverse platform 32 and carriage 50 in known manner. For example, one could have two microswitches which effectively define the upper and lower limits of the travel of the platform 32, and two microswitches mounted on the platform 32 defining the end limits of the travel of the carriage 50. These four microswitches could be connected to a display of lamps, for example LED's, on a control panel via the input socket 90. They would then indicate when the platform 32 is in either of its extreme positions, or when the carriage 50 is in either of its extreme positions. This can be used as a confidence check that the apparatus is indeed working as expected. It can also be used to reset the 0 position every time a limit position is reached, in case any errors creep into the movement of the apparatus. Any microswitches and the like mounted in the duct can be sealed, and operated at a low voltage and low current, so as to eliminate any sparking or airing which could ignite flammable gases and vapours.

It will thus be appreciated that the arrangement of the intermediate shaft 76 and the drive shafts 14, 15 and 36, together with the bevel gears, permit anyone of the drive shafts 14, 15, 36 to be driven at any time. Thus, to drive the platform 32 up or down, compressed air is supplied the two pneumatic devices 26, 27. This urges the two first shafts 14, 15 upwards, so that the bevel gears 22, 24 engage the corresponding bevel gears 23, 25 on the intermediate shaft. Then, a signal is supplied to the stepping motor 80, to cause it to step through the required number of steps or angle. This is converted into a corresponding vertical movement of the platform 32, to bring it to the desired position. The air pressure to the pneumatic actuation devices 26, 27 is then released. To bring the carriage 50 to a required horizontal position, air pressure is supplied via the inlet port 70 to the pneumatic actuation device 66. This urges the second shaft 36 upwards, so that its bevel gear 72 meshes with the corresponding bevel gear 73 on the intermediate shaft. Again, a signal can be sent to the stepping motor 80, to cause the shaft 36 to turn through the required angle, to give the necessary lateral movement of the carriage 50.

Thus, one has a single motor 80, external of the duct 2, which can be used to bring the carriage 50 to any desired position on the cross-section of the duct 2.

In use, an appropriate probe would be mounted on the carriage 50. Here, for example, a simple cone 100 is shown mounted on the carriage 50. An outlet line 102 connects the probe 100 to an outlet port 104.

In use, it is envisaged that the apparatus 1 would be connected to a computerized control unit. The control unit would be connected by control lines to the stepping motor 80 for controlling it, and also by pneumatic lines connected to the inlet ports 30, 70 for controlling the drive shafts 14, 15 and 36. Further, the control unit should include means for recording the data from the probe 100, and correlating this probe with this position, as determined from the control signal sent to the motor, etc. By this means, the probe 100 can be traversed across the full cross-section of the duct 2, in a series of lines. From this, one can build up a picture of the concentration of a particular constituent and how it varies across the duct 2. This should show if there is a particularly strong concentration at a particular point, indicative of a part of the filter 4 which is malfunctioning.

Figure 4:
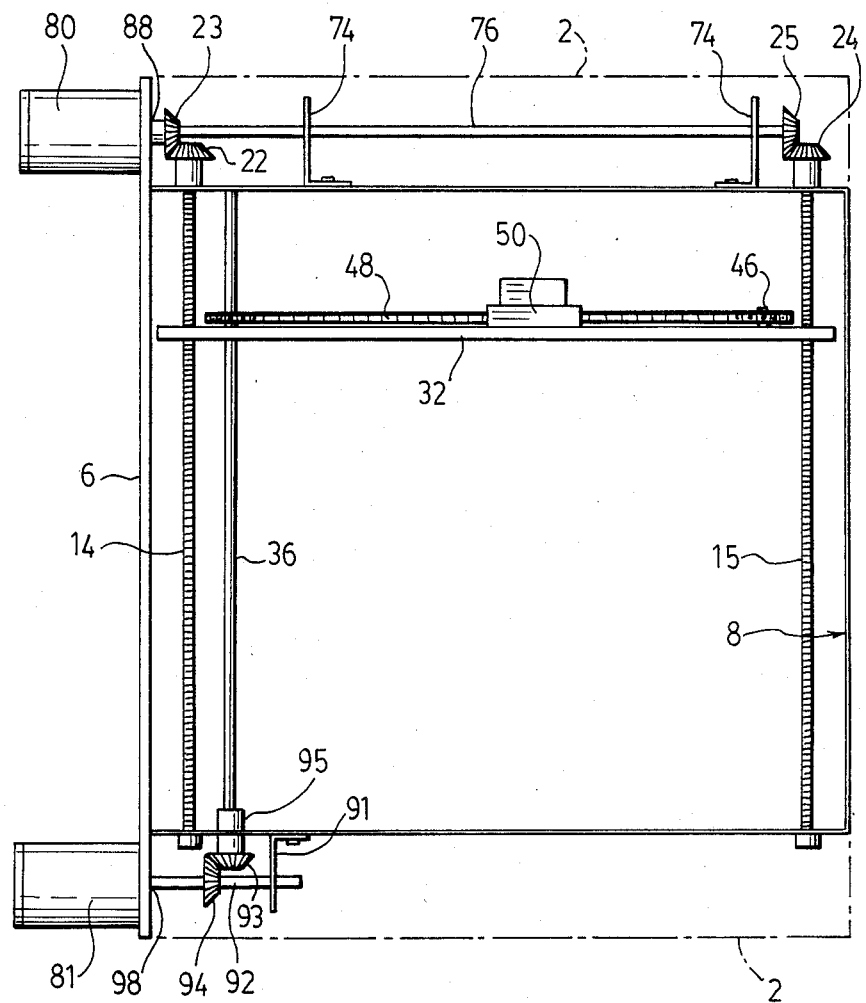
FIG. 4 shows a view along the axis of a duct of an alternative embodiment of the apparatus.

Reference will now be made to FIG. 4, which shows a variant embodiment of the present invention. In this embodiment, components common to the first embodiment of FIGS. 1, 2 and 3 are denoted by the same reference numeral.

This embodiment differs from the first embodiment, in that a separate drive unit is provided for the first drive shafts 14, 15 and the second drive shaft 36. Here, the stepping motor 80 is arranged only to drive the first drive shafts 14, 15. Thus, the pair of bevel gears 72, 73 for transmitting drive from the intermediate shaft 76 to the second shaft 36 are omitted. Consequently, only the bevel gears 22, 23 and 24, 25 are provided. Further, since alternative drive paths do not have to be provided, these bevel gears 22, 23 and 24, 25 are permanently meshed with one another. Thus, there is a permanent drive connection between the motor 80 and first drive shafts 14, 15.

To provide drive for the second drive shaft 36, a second stepping motor 81 is provided. This motor 81 has an output shaft 92. As required, one end of the output shaft 92 can be supported in a bracket 91 attached to the frame 8. (The frame 8 can otherwise be generally similar to that of the first embodiment.) At the bottom of the second shaft 36, there is a bevel gear 93, which meshes with a corresponding bevel gear 94 mounted on the output shaft 92. The second shaft 36 is then simply pivotally mounted at its upper end. To locate the second shaft 36 axially, a collar 95 can be provided, so that part of the frame 8 is trapped between the collar 95 and bevel gear 93, thereby securing the second shaft 36 in position.

Corresponding to the fluid seal 88, a second fluid seal, indicated at 98, is provided for the second stepping motor 81.

It will thus be seen that this arrangement simplifies the elements of the drive assembly. The pneumatic actuation devices 26, 27 and 66, and associated springs, etc. can be eliminated. The only penalty is the necessity of providing a second fluid seal 98. As for the first embodiment, all the drive components are located within the duct 2.

In use, to displace the platform 32 or carriage 50, the stepping motors 80, 81 are actuated separately. Indeed, it may be possible to actuate the stepping motors 80, 81 simultaneously, as the arrangement of the drive shafts 14, 15 and 36 ensures that the two motions do not interfere with one another. Thus, the stepping motor 80 is actuated as required, to move the platform 32 to any required position. Then, the carriage 50 can be traversed across the platform 32, by means of the second stepping motor 81.

The view of FIG. 4 shows a horizontal platform 32, and stepping motors 80, 81 to one side of the duct. This is expected to be the most advantageous configuration. However, it is possible for the stepping motors 80, 81 to be directly connected to the drive shafts. Thus, the stepping motor 80 could be located on top of the duct 2, with its shaft vertical. This shaft could then be directly connected to the first drive shaft 14. The second drive shaft 15 could then be driven from the first drive shaft 14, by any known means, such as a chain drive. The second stepping motor 81 would then be located underneath the duct 2, again with its shaft vertical. Its shaft could be connected to the second shaft 36 directly. This would eliminate the bevel gears.

By way of example, each stepping motor can have 200 discrete steps per revolution, and the gearing and drive shaft arrangement can be such as to displace the carriage both vertically and horizontally in steps of 0.2". Thus, one can have a full square grid of monitoring points, spaced at 0.2" intervals. This provides considerably more accurate measurement of the efficiency of a filter, as compared to simply sweeping a hand held probe across the face of the filter. Further, the control system can be such that, if a "hot spot" is detected, i.e. a spot where the concentration of a constituent is particularly high, then the probe 100 can be sent back to check that spot. Thus, the probe 100 could initially check on a predetermined grid at preset time intervals, e.g. 1/10 second. When a hot spot is detected, it can go back and check, spending longer, e.g. 1 second, at each grid point. When a hot spot is detected an alarm can be sounded, and a different alarm can be maintained whilst the longer delay period check is carried out. Once a number, say 5, of points are found with acceptable readings, the alarm is cancelled and the normal time intervals resumed.

It is to be appreciated that, a number of variations can be made in the embodiment described. Thus, although it is shown with bevel gears having a 45° angle, other types of gears or other transmission means could be employed. For the pneumatic actuation devices 26, 27, 66, these should be selected, so as to occupy a minimum space in the duct, and fit within the duct. For example, they could be piston and cylinder assemblies having a diameter of ½" or 1". For these two diameters, they could operate at 60 or 15 PSI respectively. Ideally, they should operate at a fairly low pressure. Further, as is known, when gas pressure is applied to one side of the piston, then the other side has to be vented. Here, it may prove desirable, for some applications, to vent the other side of the piston and cylinder assemblies to the outside.

It should also be borne in mind that the apparatus could be applied to a number of different functions. Thus, although it has been described primarily applied to monitoring constituents of a gas flow, it is equally applicable to checking the constituents of a liquid flow.

A variety of probes can be used. Where a simple cone 100 as described is employed, it could be connected to a photometer outside of the duct. This again helps to keep electrical components out of the duct.

I claim:

1. An apparatus, suitable for use in monitoring the constituents of a fluid flow, the apparatus comprising: a platform means adapted for spanning a duct; a first drive shaft for driving the platform means across the duct; a carriage means slidably mounted on the platform means and adapted to carry a sampling probe; a second drive shaft for driving the carriage means along the platform means, whilst permitting movement of the platform means when driven by the first drive shaft; drive means arranged for mounting outside the duct and for driving the first and second drive shafts; and a fluid seal means, providing a fluid seal for the drive means, to prevent communication between the interior and exterior of the duct.

2. An apparatus as claimed in claim 1, which includes two first drive shafts, which are parallel to one another and support opposite ends of the platform means.

3. An apparatus as claimed in claim 2, wherein all of the drive shafts are parallel to one another.

4. An apparatus as claimed in claim 3, wherein the drive means comprises first and second drive motors, with the first drive motor coupled to the first drive shaft and the second drive motor coupled to the second drive shaft, and wherein the first and second drive motors are provided with respective first and second fluid seals.

5. An apparatus as claimed in claim 4, wherein the drive shafts extend vertically, and the first and second drive motors are mounted on one side of the apparatus and include output shafts that extend horizontally, and wherein gears are provided to couple the output shafts of the drive motors to the respective drive shafts.

6. An apparatus as claimed in claim 4 or 5, wherein each drive motor is a stepping motor.

7. An apparatus as claimed in claim 3, wherein the first drive shafts are threaded, and corresponding internally threaded collars are secured to the platform means, so that rotation of the first drive shafts displaces the platform means.

8. An apparatus as claimed in claim 1, which includes a frame, wherein ends of the first and second drive shafts are rotatably mounted in the frame.

9. An apparatus as claimed in claim 8, which includes microswitches mounted on the frame, for detecting extreme positions of the platform means, and microswitches mounted on the platform means for detecting extreme positions of the carriage means.

10. An apparatus as claimed in claim 9, which includes an electrical socket mounted in the frame, which electrical socket is connected to said microswitches.

11. An apparatus as claimed in claim 10, which includes a sampling inlet device mounted on the carriage means, an outlet port in the frame, and a sampling tube connecting the sampling inlet device to the outlet port.

12. An apparatus suitable for use in monitoring the constituents of a fluid flow, the apparatus comprising: a platform means adapting for spanning a duct; threaded collars secured to the platform means; two first, threaded drive shafts that support opposite ends of the platform means, the first drive shafts being parallel to one another and engaging the threaded collars of the platform means so that rotation of the drive shafts drives the platform means across the duct; carriage means slidably mounted on the platform means and adapted to carry a sampling probe; a driven wheel rotatably mounted on the platform means, for driving the carriage; a second drive shaft, which has a constant cross-section along the majority of its length and includes a drive formation therealong, which extends parallel to the first drive shafts, and which engages the driven wheel of the platform means for driving the carriage means along the platform means, whilst permitting movement of the platform means when driven by the first drive shafts; drive means arranged for mounting outside the duct and for driving the first and second drive shafts; and a fluid seal means, providing a fluid seal for the drive means, to prevent communication between the interior and the exterior of the duct.

13. An apparatus as claimed in claim 12, wherein the driven wheel comprises a sprocket, which is rotatably mounted on the platform means, and wherein an idler sprocket is rotatably mounted at the other end of the platform means, and a chain extends around said sprockets and is secured at one point to the carriage means.

14. An apparatus as claimed in claim 13, wherein the platform means is provided with guide members extending the length thereof, and the carriage means is slidably mounted on said guide members, to maintain the carriage means in the correct orientation.

15. An apparatus, suitable for use in monitoring the constituents of a fluid flow, the apparatus comprising: a platform means adapted for spanning a duct; a first drive shaft for driving the platform means across the duct; a carriage means slidably mounted on the platform means and adapted to carry a sampling probe; a second drive shaft for driving the carriage means along the platform means, whilst permitting movement of the platform means when driven by the first drive shaft; an intermediate shaft; respective first and second transmission means for transmitting power between the intermediate shaft and the first and second drive shafts; first and second actuation means for causing engagement of the first and second transmission means respectively; drive means comprising a single drive motor arranged for mounting outside the duct and for driving the first and second drive shafts via the intermediate shaft; and a fluid seal means providing a fluid seal for the drive means to prevent communication between the interior and the exterior of the duct.

16. A containment system, which includes a duct, and an apparatus as claimed in claim 1, 15 or 4, which apparatus is mounted in the duct, with each drive motor outside the duct.

17. An apparatus as claimed in claim 15, wherein the intermediate shaft is at an angle to the drive shafts.

18. An apparatus as claimed in claim 17, wherein each of the first and second transmission means comprises a pair of gears, one of which is mounted on the intermediate shaft and the other of which is mounted on a respective drive shaft, which gears are adapted for meshing with one another under the action of the respective actuation means.

19. An apparatus as claimed in claim 18, wherein the gears of each transmission means comprise a pair of bevel gears.

20. An apparatus as claimed in claim 19, wherein the intermediate shaft is perpendicular to the drive shafts, and wherein each pair of bevel gears comprises a pair of miter gears.

21. An apparatus as claimed in claim 15, wherein each of the actuation means is a pneumatic actuation device.

22. An apparatus as claimed in claim 21, wherein each pneumatic actuation device comprises a pneumatic piston and cylinder assembly, mounted for axially displacing the respective drive shaft.

23. An apparatus as claimed in claim 21 or 22, wherein each drive shaft is provided with biassing means, biassing the drive shafts into a normal position in which the transmission means are not engaged, and wherein each of the pneumatic actuation devices can displace the respective drive shaft, against the action of said biassing means, to cause engagement of the respective transmission means.

24. An apparatus as claimed in claim 21 or 22, wherein each drive shaft is provided with a spring that urges each drive shaft into a position in which the corresponding transmission means is not engaged, and wherein the pneumatic actuation devices are arranged for displacing the drive shafts against the action of said springs, to cause engagement of the transmission means.

25. An apparatus as claimed in claim 15, wherein the drive motor is a stepping motor.

26. An apparatus, suitable for use in monitoring the constituents of a fluid flow, the apparatus comprising: a generally rectangular frame; two first drive shafts mounted adjacent and parallel to respective opposite side members of the frame; a second drive shaft mounted parallel and adjacent to one of the first drive shafts, with all the drive shafts being rotatably mounted in end members of the frame and with all the drive shafts extending through one end member; a platform extending across the frame perpendicular to the drive shafts, and driven shafts; a carriage slidably mounted on the platform and driven by the second drive shaft; an intermediate shaft rotatably mounted adjacent to said one end member; for each drive shaft respective, transmission means, comprising a pair of gears, one of which is mounted on the intermediate shaft and the other of which is mounted on the end of the respective drive shaft; for each drive shaft, a pneumatic actuation device, capable of displacing that drive shaft axially, to cause the gears of the respective transmission means to engage, with the pneumatic actuation devices for the first drive shafts connected to a common supply line; drive means connected to the intermediate shaft, outside a duct; and a seal around the intermediate shaft, for isolating the interior of the duct from the exterior, in use.

* * * * *